United States Patent
Hashemzadeh et al.

(10) Patent No.: US 6,695,993 B2
(45) Date of Patent: Feb. 24, 2004

(54) PROCESS FOR FORMING RECYCLABLE ARTICLES

(75) Inventors: Abdulmajid Hashemzadeh, Burgkirchen (DE); Klaus Kohlhammer, Marktl (DE); Konrad Alfons Wierer, Burghausen (DE); Herbert Pröbstl, Braunau am Inn (AU)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 142 days.

(21) Appl. No.: 10/056,273

(22) Filed: Jan. 25, 2002

(65) Prior Publication Data

US 2002/0135086 A1 Sep. 26, 2002

(30) Foreign Application Priority Data

Jan. 25, 2001 (DE) .......................................... 101 03 213

(51) Int. Cl.$^7$ ........................... A29B 11/14; A29B 13/10
(52) U.S. Cl. ...................... 264/37.1; 264/109; 264/118; 264/122; 264/128; 264/140; 241/3
(58) Field of Search ................................ 264/37.1, 109, 264/118, 122, 128, 140; 241/3

(56) References Cited

U.S. PATENT DOCUMENTS

| 5,977,244 A | 11/1999 | Kohlhammer et al. | |
| 6,004,428 A | 12/1999 | Schumacher et al. | |
| 6,159,568 A * | 12/2000 | Freedman et al. | 428/36.91 |
| 6,537,404 B1 * | 3/2003 | Ishiwatari et al. | 156/78 |
| 2001/0034399 A1 | 10/2001 | Kohlhammer et al. | |

FOREIGN PATENT DOCUMENTS

| DE | 43 37 715 A1 | 5/1995 |
| DE | 195 35 792 A1 | 3/1997 |
| DE | 44 25 323 C2 | 6/2000 |
| DE | 100 14 399 A1 | 10/2001 |
| EP | 0 894 888 A1 | 2/1999 |
| EP | 0 965 672 A1 | 12/1999 |
| EP | 0 807 704 B1 | 11/2000 |

OTHER PUBLICATIONS

Derwent Abstract Corresponding to EP–A 0 965 672 [AN 2000 064457].
Derwent Abstract Corresponding To DE 195 35 792 [AN 1997–193861].
Fox T.G., Bull. Am. Physics Soc. 1, 3, p. 123 [1956].
Polymer Handbook, 2$^{nd}$ Edition, J. Wiley & Sons, New York [1975].
Derwent Abstract Corresponding To De 43 37 715 [AN 1995–179978].
Derwent Abstract Corresponding To De 44 25 323 [AN 1996–078558].

* cited by examiner

Primary Examiner—Stephen J. Lechert, Jr.
(74) Attorney, Agent, or Firm—Brooks Kushman P.C.

(57) ABSTRACT

A process for forming particulate materials and binders into articles that are reusable after comminution, wherein the particulate materials are treated with a binder composition containing.

A) one or more copolymers containing one or more comonomer units selected from the group consisting of vinyl esters of branched or unbranched alkyl carboxylic acids of 1 to 18 carbon atoms, acrylic or methacrylic esters of branched or unbranched alcohols of 1 to 15 carbon atoms, dienes, olefins, vinyl aromatics and vinyl halides, and further containing 4 to 60% by weight, based on the total weight of the copolymer, of one or more comonomer units containing polar groups, and B) one or more fillers having a polar surface capable of interaction with the polar groups of copolymer A), and formed into articles and consolidated, and, if appropriate, the formed article obtained thereby is comminuted for recycling and the material obtained thereby is reused for forming new articles.

17 Claims, No Drawings

PROCESS FOR FORMING RECYCLABLE ARTICLES

BACKGROUND OF THE INVENTION

1. Field of the Invention

This invention relates to a process for forming particulate materials, especially fiber materials, and binders into articles that are recyclable after comminution.

2. Background Art

Fiberboard is often manufactured using pulverulent binders based on crosslinkable and noncrosslinkable addition polymers. Noncrosslinkable binders used include for example polypropylene (PP) or polyethylene (PE). Since polyethylene and polypropylene are thermoplastic, fiberboard manufactured using polypropylene or polyethylene deforms at high temperatures because of its low heat resistance.

In contrast, fiberboard manufactured using crosslinkable binders such as phenolic resins or styrene-acrylate copolymers having crosslinkable groups possesses very good thermal deformation resistance (EP-A 894888, DE-A 10014399). Fiberboard of this type has the disadvantage, however, of being impossible to recycle owing to the irreversible, chemical crosslinking. Fiberboard of this type can at most be comminuted and ground and the material obtainable thereby reused as a filler.

EP-A 807704 discloses a process for recovering fibers from fiber materials wherein the fibers are ionically bonded by a carboxyl-functional polymer whose carboxyl groups are crosslinked by an alkaline earth metal ion. The process comprises treating the fiber material with an aqueous solution of a salt whose anion forms a sparingly soluble salt with the alkaline earth metal cations and then removing the debindered fibers.

DE-A 19535792 describes a process for preparing recyclable fiber composites by bonding the fibers together using an aqueous polymer dispersion whose film is converted into an aqueous addition polymer solution upon a change of pH. After the bonding agent, or binder, has been converted into an aqueous solution, the fiber material can be removed and fibers and binders reused.

SUMMARY OF THE INVENTION

It is an object of the present invention to provide a process for forming articles, especially from fiber materials, which possess a high thermal deformation resistance and are recyclable.

DETAILED DESCRIPTION OF THE PREFERRED EMBODIMENT(S)

These and other objects are achieved by a process for forming particulate materials and binders into articles that are recyclable after comminution, wherein the particulate materials are treated with a binder composition containing A) one or more polymers consisting at least one comonomer unit selected from vinyl esters of branched or unbranched alkyl carboxylic acids of 1 to 18 carbon atoms, acrylic or methacrylic esters of branched or unbranched alcohols of 1 to 15 carbon atoms, dienes, olefins, vinyl aromatics and vinyl halides, and further containing 4 to 60% by weight, based on the total weight of the copolymer, of one or more units containing polar groups, and B) 4 to 25% by weight, based on the total weight of polymer and filler, of one or more fillers having a polar surface capable of interaction with the polar groups of polymer(s) A). The binder-containing particulate materials are then formed into articles and consolidated.

Useful vinyl esters include vinyl esters of branched or unbranched carboxylic acids of 1 to 18 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids of 5 to 11 carbon atoms, for example VeoVa9$^R$ or VeoVa10$^R$ vinyl esters (trade names of Shell). Vinyl acetate is particularly preferred.

Useful monomers from the group of the esters of acrylic acid or methacrylic acid include esters of branched or unbranched alcohols of 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate, norbornyl acrylate. Particular preference is given to methyl acrylate, methyl methacrylate, n-butyl acrylate, 2-ethylhexyl acrylate and norbornyl acrylate.

Useful dienes include 1,3-butadiene and isoprene. Examples of copolymerizable olefins are ethene and propene. Useful vinyl aromatics for copolymerization include styrene and vinyltoluene. Vinyl chloride is the customary vinyl halide.

Useful polar groups are, for example, carboxyl, hydroxyl, phosphonate, sulfonate or NH groups.

Useful carboxyl-functional comonomers for copolymer A) include ethylenically unsaturated mono- and dicarboxylic acids, preferably acrylic acid, methacrylic acid, crotonic acid, itaconic acid, fumaric acid and maleic acid. The carboxyl function may also be introduced by copolymerizing maleic anhydride into the copolymer A). Useful hydroxyl-functional comonomers include hydroxyalkyl acrylates and hydroxyalkyl methacrylates having a $C_1$- to $C_8$-alkyl radical, preferably hydroxyethyl acrylate and methacrylate, hydroxypropyl acrylate and methacrylate, and hydroxybutyl acrylate and methacrylate. Useful NH-functional comonomers include (meth)acrylamide, diacetoneacrylamide, maleimide, alkyl maleamate, alkyl fumaramate, maleamide, fumaramide, vinyl glutaramate, vinyl succinamate, allyl glutaramate, allyl succinamate, dimethylaminoethyl methacrylate, dimethylaminopropylmethacrylamide, trimethylammonium methyl methacrylate chloride, and trimethylammonium propylmethacrylamide chloride. A useful phosphonate-functional comonomer is vinyl phosphonate. Useful sulfonate-functional comonomers include vinyl sulfonate, styrenesulfonic acid, and 2-acrylamido-2-methylpropanesulfonic acid.

Preference is given to carboxyl-functional comonomer units, preferably those derived from acrylic acid, methacrylic acid, crotonic acid, itaconic acid, fumaric acid, maleic acid and maleic anhydride. The fraction of functional units in copolymer A) is in the range from 4 to 60% by weight and preferably in the range from 5 to 25% by weight, each percentage being based on the total weight of the copolymer. Each polar comonomer may be used to the exclusion of one or more of other polar comonomers.

Preference is given to the polymer compositions specified below for copolymer A), which additionally includes, in the foregoing amounts, the functional group-containing monomer units previously described:

vinyl acetate polymers; vinyl ester-ethylene copolymers, such as vinyl acetate-ethylene copolymers; vinyl ester-ethylene-vinyl chloride copolymers where the vinyl ester component is preferably vinyl acetate and/or vinyl propionate and/or one or more copolymerizable vinyl esters such as vinyl laurate, vinyl pivalate, vinyl 2-ethylhexanoate, vinyl esters of an alpha-branched carboxylic acid of 5 to 11 carbon atoms, especially vinyl versatate (VeoVa9$^R$, VeoVa10$^R$); vinyl acetate copolymers with one or more copolymerizable vinyl esters such as vinyl laurate, vinyl pivalate, vinyl 2-ethylhexanoate, vinyl esters of an alpha-branched carboxylic acid of 5 to 11 carbon atoms, especially vinyl versatate (VeoVa9$^R$, VeoVa10$^R$), which optionally contain ethylene as well; vinyl ester-acrylic ester copolymers, especially with vinyl acetate, butyl acrylate and/or 2-ethylhexyl acrylate, which optionally contain ethylene as well; vinyl ester-acrylic ester copolymers with vinyl acetate and/or vinyl laurate and/or vinyl versatate and acrylic esters, especially butyl acrylate or 2-ethylhexyl acrylate, which also optionally contain ethylene as well.

Particular preference is given to (meth)acrylic ester and styrene polymers: copolymers with n-butyl acrylate and/or 2-ethylhexyl acrylate; copolymers of methyl methacrylate with butyl acrylate and/or 2-ethylhexyl acrylate and/or 1,3-butadiene; styrene-1,3-butadiene copolymers and styrene-(meth)acrylic ester copolymers such as styrene-butyl acrylate, styrene-methyl methacrylate-butyl acrylate or styrene-2-ethylhexyl acrylate, where the butyl acrylate used can be n-, iso- or tert-butyl acrylate.

Most preference is given to compositions having a carboxyl-functional styrene-n-butyl acrylate and/or a carboxyl-functional styrene-methyl methacrylate-n-butyl acrylate copolymer as copolymer A).

The comonomers and their weight fractions are chosen so that in general the resultant glass transition temperature Tg is in the range from 40° C. to 110° C. in the case of polymers used in powder form and in the range from −30° C. to 95° C. in the case of polymers used in aqueous dispersion or solution. The glass transition temperature Tg of the addition polymers can be determined in a known manner by differential scanning calorimetry (DSC). The Tg can also be approximately predicted by means of the Fox equation, i.e. aAccording to T. G. Fox, Bull. Am. Physics Soc. 1, 3, page 123 (1956):

$$1/Tg = x_1/Tg_1 + x_2/Tg_2 + \ldots + x_n/Tg_n,$$

where $x_n$ is the mass fraction (% by weight/100) of monomer n and $Tg_n$ is the glass transition temperature in kelvin of the homopolymer of monomer n. Tg values of homopolymers are given in the Polymer Handbook 2nd Edition, J. Wiley & Sons, New York (1975).

The addition polymers may be prepared by known free-radically initiated polymerization processes, for example by solution polymerization, aqueous suspension polymerization, or aqueous emulsion polymerization. Preference is given to emulsion polymerization. The solutions or dispersions may be dried using all common drying processes: spray drying, drum drying, freeze drying, belt drying, coagulation with subsequent fluidized bed drying. Preference is given to using spray drying and drum drying processes.

The addition polymers may be used in dry pulverulent form, in the form of an aqueous dispersion, or in water-dissolved form. The addition polymers are preferably used as powders.

Useful fillers include pulverulent organic and inorganic materials having a polar surface, generally having a hydroxyl-functional surface. Examples of inorganic fillers are titanium dioxide, aluminum oxide, aluminum hydroxide, magnesium oxide, quartz flour, glass fiber, glass powder, chalk, talc, lime, calcium carbonate, magnesium carbonate, barium sulfate, kaolin, dolomite, magnesium silicate, calcium silicate and silicates such as aluminum silicate. Examples of organic fillers are wood flour, cellulose, starch and also synthetic polar polymers having a Tg>90° C., for example polyesters, crosslinked carboxyl- or sulfonate-functional styroacrylates, the latter especially as hollow spheres, plasma-treated polymer powders and also polymer resin wastes. The average particle size of the pulverulent fillers is generally in the range from 5 nm to 900 μm.

The binder composition contains 4 to 25% by weight and preferably 5 to 20% by weight of filler, each percentage being based on the total weight of addition polymer and filler. The binder composition may be prepared by mixing the aqueous dispersions or solution of the addition polymer with the filler. In the process, the filler is often applied in the form of a paste, in a blend with surfactants. Pulverulent binder compositions may be prepared by drying these aqueous mixtures. It is also possible for polymer powder and filler powder to be mixed or conjointly extruded from an extruder; preferably in such a way that the mixing temperature is lower than the minimum filming temperature MFT of the addition polymer in order that complete wetting of the filler particles with the addition polymer may be avoided.

The binder composition is useful for forming articles from particulate materials such as fiber materials or particulate materials selected from mineral materials, plastic materials or natural materials such as wood shavings, cork particles, glass particles or glass powder, especially recycled glass and glass microballoons, or from combinations thereof. The preferred use is as a binder for fiber materials. Useful fiber materials include natural or synthetic raw materials. Examples thereof are manufactured fibers based on fiber-forming polymers such as viscose, polyester, for example chopped polyester fibers, polyamide, polypropylene, and polyethylene fibers. It is also possible to use mineral fibers such as glass fibers, ceramic fibers, and/or carbon fibers. Examples of natural fiber materials are wood, cellulose, wool, cotton, jute, flax, hemp, coir, ramie and sisal fibers. The fibers can also be used in the form of woven textiles, in the form of yarns, or in the form of nonwovens such as nonwoven scrims or formed-loop knits. These nonwovens may, if appropriate, be mechanically preconsolidated, for example needled.

Depending on their intended application, the articles are formed at room temperature or at elevated temperature, if appropriate, under elevated pressure. The temperature for consolidating the formed articles is generally in the range from 20° C. to 220° C. When an elevated consolidation temperature is used, it is preferably in the range from 90 to 220° C. When the formed articles are produced under pressure, it is preferable to employ pressures in the range from 1 to 200 bar. The binder composition is generally used for forming the articles in an amount of 5 to 50% by weight, based on the material to be bound. The binder quantity depends on the substrate to be bound and is preferably between 10 and 40% by weight in the case of polyester and cotton fibers, and preferably in the range from 20 to 40% by weight in the case of natural fibers such as hemp, flax, sisal, jute, for example for automotive interior applications. In the case of glass and mineral fibers and also with other mineral materials, such as glass balls, the preferred range is between 10 and 30% by weight. A further application is the manufacture of HDF and MDF and of wood extrudates, for which the binder composition is mixed with wood particles and subsequently extruded.

Fibrous articles are formed by mixing a pulverulent binder composition with the fibers, spreading out the fiber-powder mixture by customary methods of nonwovens technology, if appropriate after carding of the fiber-powder mixture and needling, and bonding at elevated temperature, with or without employment of pressure and/or superheated steam. The fiber bonding can also be effected by sprinkling the pulverulent binder composition into a woven fabric, a nonwoven scrim or into a previously laid-down fiber bed. After carding of the fiber-powder mixture and, if appropriate, needling, the bonding powder may be melted and cured at elevated temperature, optionally with additional employment of pressure and/or superheated steam.

When an aqueous binder composition is used, it is applied in a known manner to the particulate material or to the nonwoven by spraying, doctor coating, padding or dipping and the particulate material or nonwoven is then bonded at elevated temperature with or without employment of pressure.

It is surprising that the combination of fillers having a polar surface and polymers having polar groups provides a high thermal deformation resistance at temperatures above 70° C. without the water imbibition of the formed articles increasing significantly. Formed articles produced by this process can be comminuted for recycling and reused for forming articles, since the high thermal deformation resistance here is due to a physical interaction. Formed articles bonded in this way, in contradistinction to chemical crosslinks, remain processable at high temperatures upon reuse.

To recycle the formed articles, they are comminuted, preferably granulated or pulverized. The materials obtained thereby can again be processed into formed articles. Alternatively, the materials obtained thereby may be used as binders for forming articles from particulate materials. Recycling preferably involves the addition of further binders or of the just described binder composition of A) and B) or of virgin fiber, the latter sometimes necessary since comminution may cause the fiber form to change.

The examples hereinbelow illustrate the invention:

EXAMPLE 1

An aqueous dispersion of a copolymer of styrene, n-butyl acrylate and acrylic acid having an acrylic acid content of 10% by weight and a Tg of 95° C. was spray dried. The resultant powder was mixed separately with 10% by weight, 15% by weight and 20% by weight of a talc-dolomite mixture, each percentage being based on the total weight of polymer and filler.

Pressed boards were made by mixing 107 g of reclaimed cotton with 32 g of each of the binder compositions obtained and spreading the mixture out over an area 24×24 cm in size. The fiber-powder mixtures were additionally moistened with 10 g of water applied by spraying and pressed at 180° C. for 5 min. The molding pressure was selected so as to produce, in each case, rigid boards (2 mm in thickness, 2200 g/m² in areal weight, 1115 kg/m³ in density) and flexible boards (10 mm in thickness, 2200 g/m² in areal weight, 233 kg/m³ in density).

EXAMPLE 2 (COMPARATIVE)

Example 1 was repeated except that the styrene and n-butyl acrylate copolymer contained only 2% by weight of acrylic acid (Tg 95° C.).

EXAMPLE 3 (COMPARATIVE)

Example 1 was repeated except that polyethylene was used.

EXAMPLE 4

A board pressed according to example 1 was comminuted into particles about 2×2 mm in size and then reconstituted to a rigid board by pressing similarly to example 1.

EXAMPLE 5

A board pressed according to example 1 was comminuted as described in example 4.55 g of these particles were then mixed with 64 g of reclaimed cotton and with 19 g of the binder powder of example 1 and pressed to form rigid boards similarly to example 1.

Test Methods

Water Imbibition (WI)

Test specimens 50 mm×20 mm in size were cut from the boards and immersed in water for 1 hour and 24 hours. The weight increase due to water swelling was determined gravimetrically.

Heat Resistance (HR)

Strips 240 mm×20 mm in size were cut from the boards and fixed horizontally on a planar substrate so that the strips overhung the edge of the substrate by 100 mm. In the case of the rigid articles (board thickness: 2 mm) a 40 g weight was attached, whereas the flexible articles (board thickness: 10 mm) were only subjected to the force of gravity of their own weight. The heat resistance was determined by measuring the deflection "d" after one hour at 90° C., 100° C. and 120° C.

TABLE 1

| Example | Filler (wt. %) | HR/ 90°/ 40 g | HR/ 100° C./ 40 g | HR/ 120° C./ 40 g | WI (1 h) | WI (24 h) |
| --- | --- | --- | --- | --- | --- | --- |
| Inv. 1 | 2 | 11 mm | 12 mm | 32 mm | 29% | 38% |
| Inv. 1 | 10 | 9 mm | 11 mm | 24 mm | 23% | 33% |
| Inv. 1 | 15 | 8 mm | 13 mm | 15 mm | 37% | 52% |
| Inv. 1 | 20 | 8 mm | 18 mm | 19 mm | 56% | 69% |
| Comp. 2 | 2 | 66 mm | 67 mm | 77 mm | 11% | 21% |
| Comp. 2 | 10 | 54 mm | 69 mm | 79 mm | 31% | 55% |
| Comp. 3 | 0 | 35 mm | 39 mm | 56 mm | 23% | 27% |
| Comp. 3 | 10 | 39 mm | 43 mm | 58 mm | 17% | 22% |
| Inv. 4 | 2 | 14 mm | 22 mm | 69 mm | 19% | 31% |
| Inv. 4 | 15 | 14 mm | 36 mm | 75 mm | 15% | 31% |
| Inv. 4 | 20 | 23 mm | 52 mm | 80 mm | 23% | 36% |
| Inv. 5 | 2 | 12 mm | 17 mm | 45 mm | 25% | 35% |
| Inv. 5 | 15 | 11 mm | 16 mm | 35 mm | 23% | 41% |
| Inv. 5 | 20 | 12 mm | 20 mm | 40 mm | 43% | 56% |

The results of example 1 show a distinct improvement in the heat resistance at 120° C. over the results of the comparative examples.

The heat resistance of the recycled board of example 4 was somewhat less than that of the original board (example 1). This decrease was to be expected, since comminution of the board causes the fiber length and morphology to change. To compensate for this loss of quality, virgin and recycled raw materials were mixed together for example 5. The magnitude of the loss of quality also depends on the comminuting technique used: the bulkier the comminuted particles are, the less the loss of quality will be.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for forming particulate materials and binders into products that are recyclable and/or reusable after comminution, comprising treating particulate materials with a binder composition containing A) one or more copolymers containing one or more comonomer units selected from the group consisting of vinyl esters of branched or unbranched alkyl carboxylic acids of 1 to 18 carbon atoms, acrylic or methacrylic esters of branched or unbranched alcohols of 1 to 15 carbon atoms, dienes, olefins, vinyl aromatics and vinyl halides, and further containing 4 to 60% by weight, based on the total weight of the copolymer(s), of one or more units containing polar groups, and B) 4 to 25% by weight, based on the total weight of copolymer(s) and filler, of one or more fillers having a polar surface capable of interaction with the polar groups of copolymer A), to form treated particulate materials, and consolidating said treated particulate materials into a formed product.

2. The process of claim 1, wherein the polymers A) contain carboxyl, hydroxyl, phosphonate, sulfonate or NH groups.

3. The process of claim 1, wherein the monomers and their weight fractions of copolymer A) are selected such that the glass transition temperature Tg of copolymer(s) A) is in the range from 40° C. to 110° C. in the case of polymers used in powder form, and in the range from −30° C. to 95° C. in the case of polymers used in aqueous dispersion or solution.

4. The process of claim 2, wherein the monomers and their weight fractions of copolymer A) are selected such that the glass transition temperature Tg of copolymer(s) A) is in the range from 40° C. to 110° C. in the case of polymers used in powder form, and in the range from −30° C. to 95° C. in the case of polymers used in aqueous dispersion or solution.

5. The process of claim 1, wherein copolymers A) are copolymers of n-butyl acrylate and/or 2-ethylhexyl acrylate, copolymers of methyl methacrylate with butyl acrylate and/or 2-ethylhexyl acrylate and/or 1,3-butadiene, styrene-1,3-butadiene copolymers, or styrene-(meth)acrylate ester copolymers.

6. The process of claim 2, wherein copolymers A) are copolymers of n-butyl acrylate and/or 2-ethylhexyl acrylate, copolymers of methyl methacrylate with butyl acrylate and/or 2-ethylhexyl acrylate and/or 1,3-butadiene, styrene-1,3-butadiene copolymers, or styrene-(meth)acrylate ester copolymers.

7. The process of claim 5, wherein copolymer A) comprises carboxyl-functional styrene n-butyl acrylate or carboxyl-functional styrene-methyl methacrylate-n-butyl acrylate copolymers.

8. The process of claim 1, wherein fillers B) are one or more selected from the group consisting of titanium dioxide, aluminum oxide, aluminum hydroxide, magnesium oxide, quartz flour, glass fiber, glass powder, chalk, talc, lime, calcium carbonate, magnesium carbonate, barium sulfate, kaolin, dolomite, magnesium silicate, calcium silicate, aluminum silicate, wood flour, cellulose, starch and synthetic polar polymers of Tg>90° C.

9. The process of claim 2, wherein fillers B) are one or more selected from the group consisting of titanium dioxide, aluminum oxide, aluminum hydroxide, magnesium oxide, quartz flour, glass fiber, glass powder, chalk, talc, lime, calcium carbonate, magnesium carbonate, barium sulfate, kaolin, dolomite, magnesium silicate, calcium silicate, aluminum silicate, wood flour, cellulose, starch and synthetic polar polymers of Tg>90° C.

10. The process of claim 3, wherein fillers B) are one or more selected from the group consisting of titanium dioxide, aluminum oxide, aluminum hydroxide, magnesium oxide, quartz flour, glass fiber, glass powder, chalk, talc, lime, calcium carbonate, magnesium carbonate, barium sulfate, kaolin, dolomite, magnesium silicate, calcium silicate, aluminum silicate, wood flour, cellulose, starch and synthetic polar polymers of Tg>90° C.

11. The process of claim 5, wherein fillers B) are one or more selected from the group consisting of titanium dioxide, aluminum oxide, aluminum hydroxide, magnesium oxide, quartz flour, glass fiber, glass powder, chalk, talc, lime, calcium carbonate, magnesium carbonate, barium sulfate, kaolin, dolomite, magnesium silicate, calcium silicate, aluminum silicate, wood flour, cellulose, starch and synthetic polar polymers of Tg>90° C.

12. The process of claim 1, wherein formed products include fiber materials or particulate materials selected from mineral materials, plastic materials or natural materials.

13. The process of claim 2, wherein formed products include fiber materials or particulate materials selected from mineral materials, plastic materials or natural materials.

14. The process of claim 8, wherein formed products include fiber materials or particulate materials selected from mineral materials, plastic materials or natural materials.

15. The process of claim 1, wherein the formed products are comminuted for recycling and the material obtained thereby is reused for forming articles.

16. The process of claim 15, wherein the formed products are comminuted for recycling and the material obtained thereby is used as a binder for forming articles from further particulate materials.

17. The process of claim 15, wherein the formed products are comminuted for recycling and the material obtained thereby is combined with added amounts of further binders or of the binder composition of A) and B) or of virgin fiber, and used for forming articles from particulate materials.

* * * * *